(12) United States Patent
Schell et al.

(10) Patent No.: US 8,557,100 B2
(45) Date of Patent: Oct. 15, 2013

(54) METAL PLATING ADDITIVE, AND METHOD FOR PLATING SUBSTRATES AND PRODUCTS THEREFROM

(75) Inventors: Kevin Schell, Fort Mill, SC (US); Grant Keers, Fort Mill, SC (US); Shakeel Akhtar, Warley (GB)

(73) Assignee: Atotech Deutschland GmbH, Berlin (DE)

( * ) Notice: Subject to any disclaimer, the term of this patent is extended or adjusted under 35 U.S.C. 154(b) by 217 days.

(21) Appl. No.: 13/123,778

(22) PCT Filed: Oct. 16, 2009

(86) PCT No.: PCT/US2009/061011
§ 371 (c)(1),
(2), (4) Date: Apr. 12, 2011

(87) PCT Pub. No.: WO2010/045559
PCT Pub. Date: Apr. 22, 2010

(65) Prior Publication Data
US 2011/0195278 A1    Aug. 11, 2011

Related U.S. Application Data

(60) Provisional application No. 61/106,038, filed on Oct. 16, 2008.

(51) Int. Cl.
*C23C 18/34* (2006.01)
*C25D 3/12* (2006.01)

(52) U.S. Cl.
USPC ............ 205/260; 205/238; 205/274; 427/129

(58) Field of Classification Search
USPC ........ 427/99.1, 97.7, 99.5, 58, 244, 306, 307, 427/437, 405, 443.1, 407, 129, 130, 131; 106/1.23, 1.22, 1.26, 1.27, 122, 106/287.18; 204/554, 192.2, 192.15; 205/775, 50, 263, 264, 265, 266, 271, 205/80, 159, 260, 261, 238, 274; 428/209, 428/332; 523/218; 210/758, 759; 257/40; 438/99, 151, 678

See application file for complete search history.

(56) References Cited

U.S. PATENT DOCUMENTS

| | | | |
|---|---|---|---|
| 2,383,798 A | | 8/1945 | Hull |
| 2,847,327 A | | 8/1958 | Talmey |
| 3,972,788 A | | 8/1976 | Passal |
| 4,014,761 A | | 3/1977 | Passal |
| 4,528,245 A | | 7/1985 | Jobbins |
| 4,610,895 A | * | 9/1986 | Tubergen et al. ............ 427/99.1 |
| 4,803,097 A | | 2/1989 | Fraenkel et al. |
| 5,405,646 A | | 4/1995 | Nanis |
| 6,183,545 B1 | * | 2/2001 | Okuhama et al. ............ 106/1.26 |
| 6,251,249 B1 | * | 6/2001 | Chevalier et al. ............ 205/263 |
| 6,316,097 B1 | * | 11/2001 | Liu et al. ...................... 427/132 |
| 6,500,482 B1 | | 12/2002 | Morcos |
| 6,685,990 B1 | * | 2/2004 | Zhong et al. ................. 427/131 |
| 6,837,923 B2 | * | 1/2005 | Crotty et al. ................ 106/1.22 |
| 2003/0096064 A1 | * | 5/2003 | Suda et al. ................... 427/437 |
| 2005/0049328 A1 | * | 3/2005 | Schmiedel et al. ........... 523/218 |
| 2005/0186699 A1 | * | 8/2005 | Kawase et al. .................. 438/99 |
| 2006/0243604 A1 | * | 11/2006 | Nakagawa et al. ........... 205/775 |
| 2007/0141310 A1 | * | 6/2007 | Song et al. ................... 427/97.7 |
| 2007/0244024 A1 | * | 10/2007 | Barthel et al. ................ 510/445 |
| 2008/0118580 A1 | * | 5/2008 | Bockmuhl et al. ............ 514/570 |
| 2008/0124552 A1 | * | 5/2008 | Hashiba et al. ............... 428/407 |
| 2008/0196625 A1 | * | 8/2008 | Bialkowski et al. ..... 106/287.18 |
| 2008/0221003 A1 | * | 9/2008 | Meine et al. ................. 510/103 |
| 2008/0255017 A1 | * | 10/2008 | Dettinger et al. ............ 510/191 |
| 2009/0084682 A1 | * | 4/2009 | McMillen et al. .............. 205/50 |
| 2009/0214768 A1 | * | 8/2009 | Ichikawa et al. ............. 427/131 |
| 2010/0021695 A1 | * | 1/2010 | Naoyuki et al. ......... 204/192.15 |
| 2010/0247870 A1 | * | 9/2010 | Suzuki et al. .................. 427/58 |

FOREIGN PATENT DOCUMENTS

| | | | | |
|---|---|---|---|---|
| GB | 1234793 | 6/1971 | | |
| JP | 2005044488 | 2/2005 | | |
| JP | 2005264256 | 9/2005 | | |
| WO | 2008081904 | * 10/2008 | ............... | C25D 1/00 |

OTHER PUBLICATIONS

Supplementary European Search Report for corresponding European Application No. 09821323.4 dated Jan. 23, 2012.

Depiction of EN Coating on Al Substrate Plated from a High-P EN Bath that was Intentionally Contaminated with 200 nm Plastic Particles, the Bath containing the Additive of the Present Invention.

International Preliminary Examining Authority Preliminary Report on Patentability; Supplemental Action, Completed Apr. 13, 2011; Mailed Jun. 20, 2011.

* cited by examiner

*Primary Examiner* — Kevin M. Bernatz
*Assistant Examiner* — Louis Falasco
(74) *Attorney, Agent, or Firm* — Renner, Otto, Boisselle & Sklar, LLP

(57) ABSTRACT

The present invention is directed to the fabrication of rigid memory disks, including a metal plating composition which impedes deposition of non-metallic particles during a plating process. The plating composition includes at least one sulfated fatty acid ester additive, or mixtures or salts thereof, of formula:

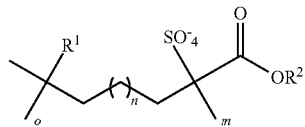

wherein R1 is selected from the group consisting of OH, $OCH_2$, $H_2CH_3$, C1-C7 alkyl, linear or branched; R2 selected from H and C1-C7 alkyl, linear or branched; m=1 to about 5; n=2 to about 30; o=0 to about 10; M+ is a metal or pseudo metal ion or H+. The additive has a zeta potential which impedes deposit of non-metallic particles. The invention is further directed to a method for electroless plating utilizing the additive composition in a bath with at least a stabilizing agent, complexing agent and reducing agent and source of metal ions.

14 Claims, 9 Drawing Sheets

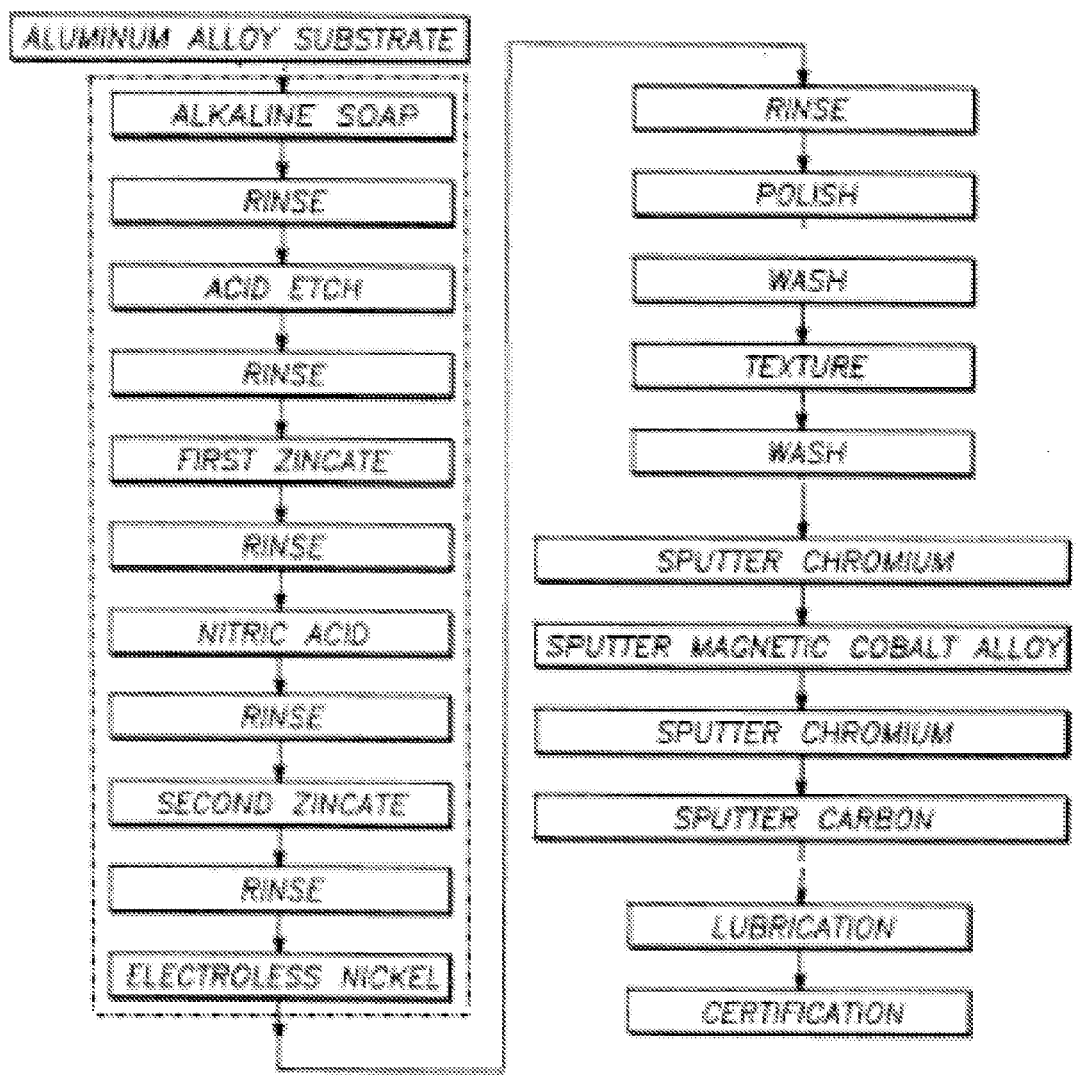
PRIOR ART
Fig. 1. Flow Chart of Rigid Memory Disk Production.

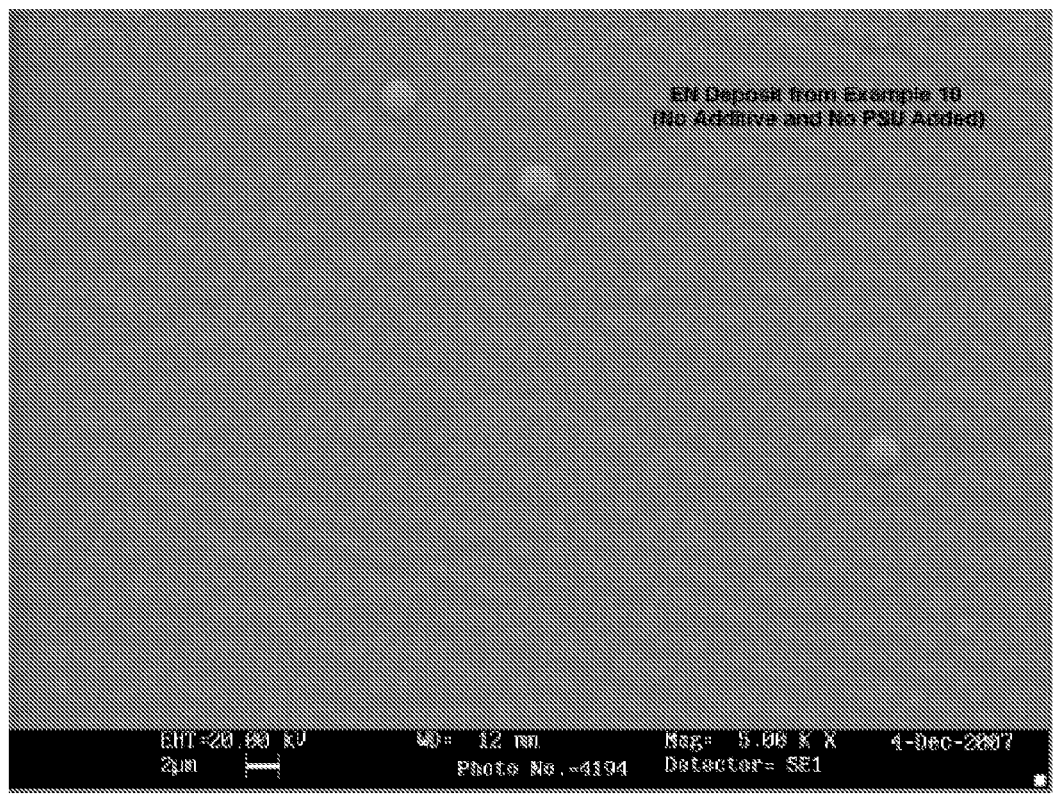
Fig. 2. Depiction of EN Coating on Al Substrate Plated from a Non-Polysulfone-Contaminated, High-P EN Bath. The Bath did not contain any Additive.

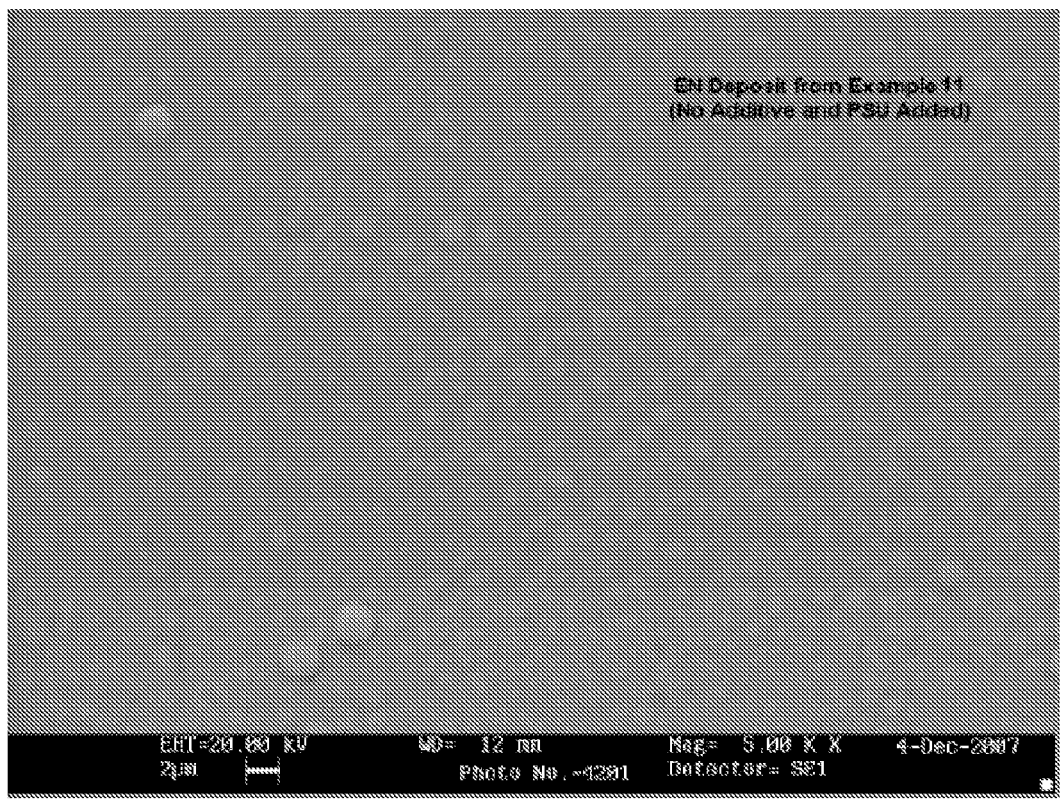
Fig. 3. Depiction of EN Coating on Al Substrate Plated from a High-P EN Bath that was Intentionally Contaminated with 200 nm Plastic Particles. The Bath did not contain any Additive.

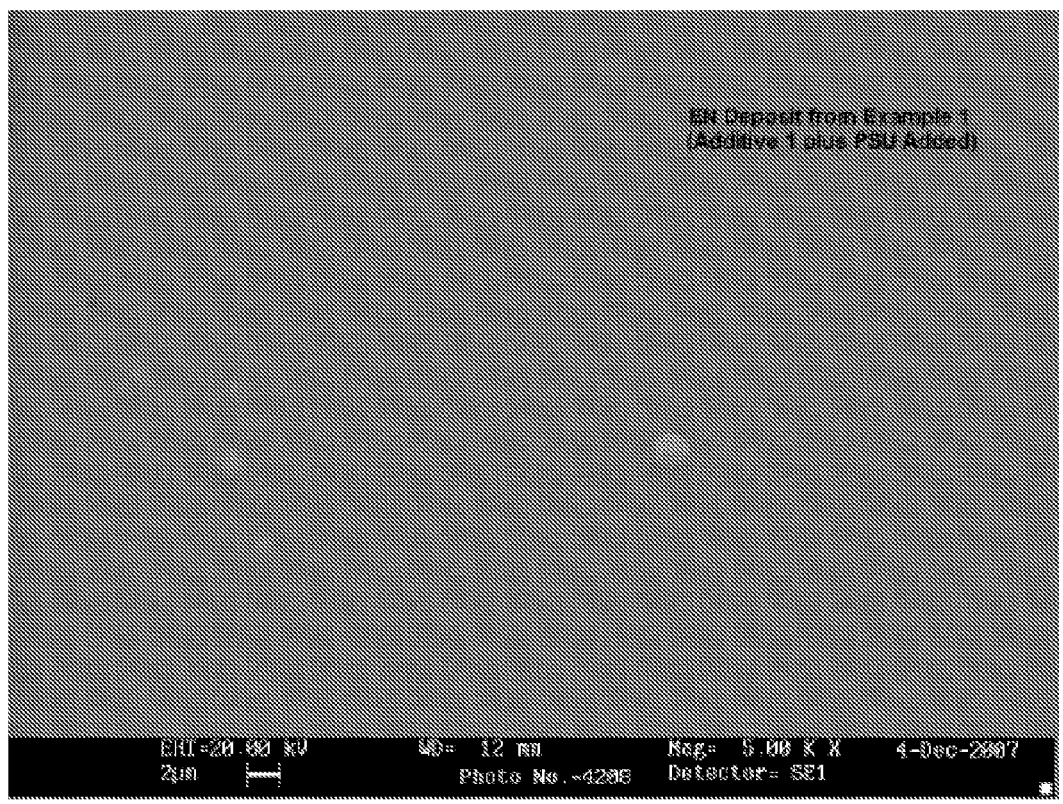
Fig. 4. Depiction of EN Coating on Al Substrate Plated from a High-P EN Bath that was Intentionally Contaminated with 200 nm Plastic Particles, the Bath containing the Additive of the Present Invention.

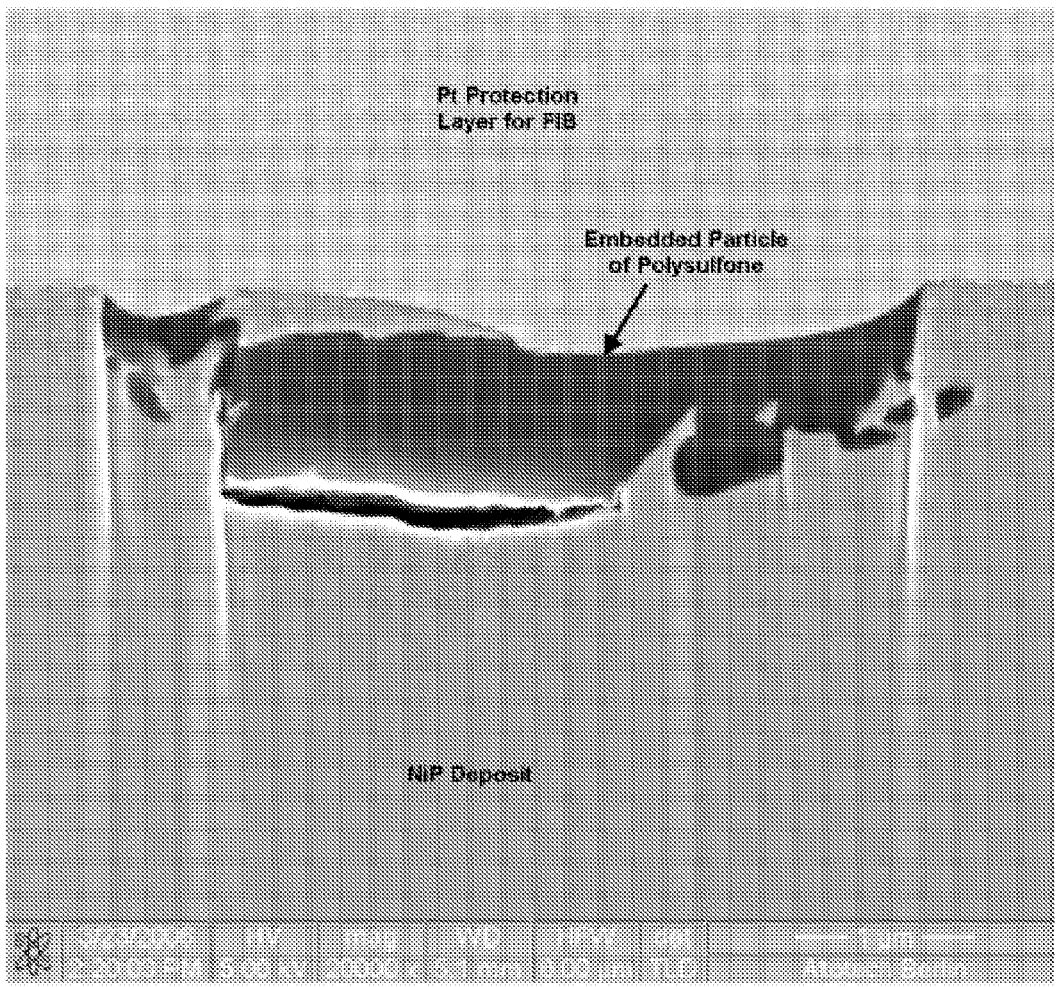
Fig. 5. Polysulfone Particle Embedded in an Electroless Nickel Coating.

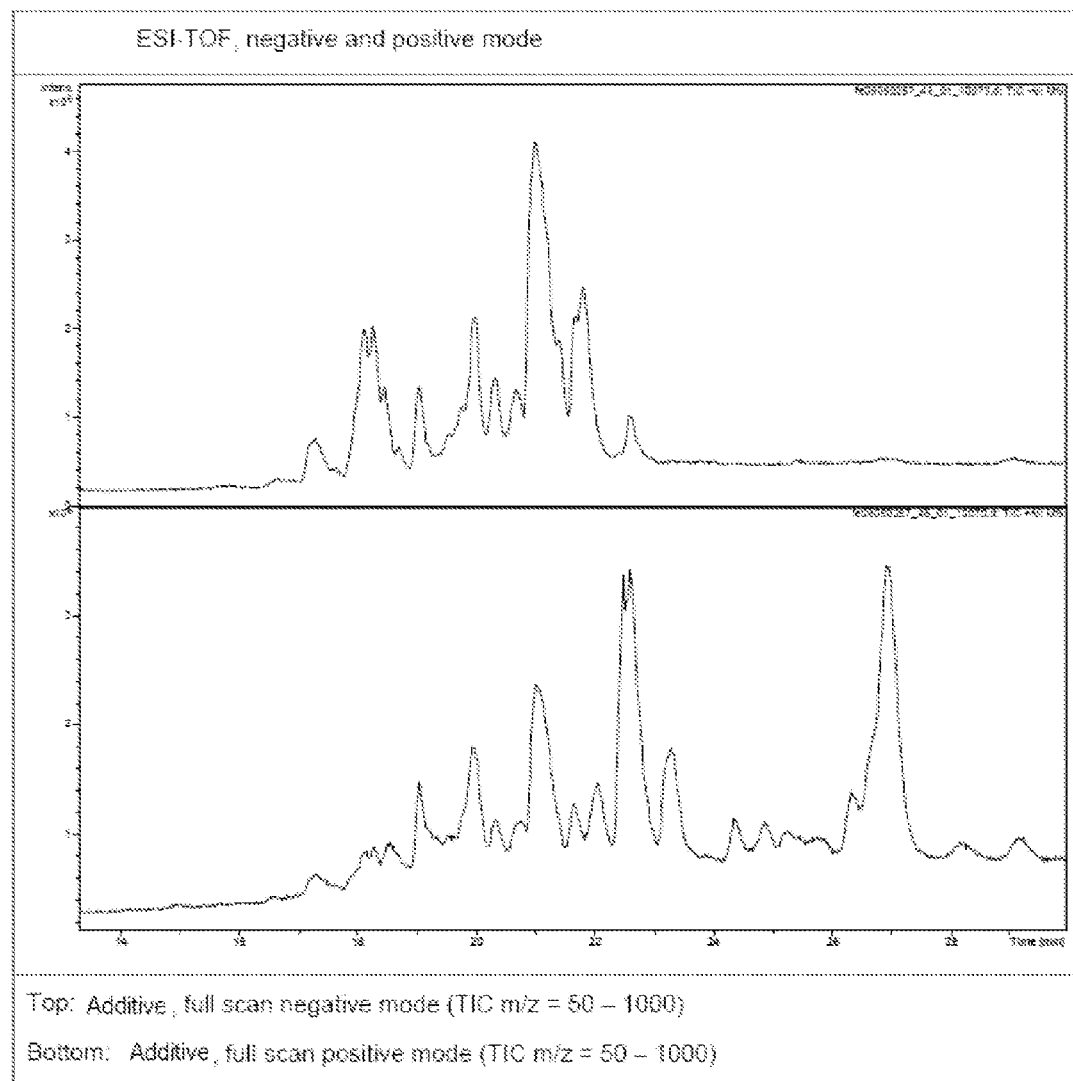
Fig. 6. Mixture Separation of the Sulfated, Fatty Acid Ester (Additive) by Chromatography Showing Retention Time on the Column in Minutes.

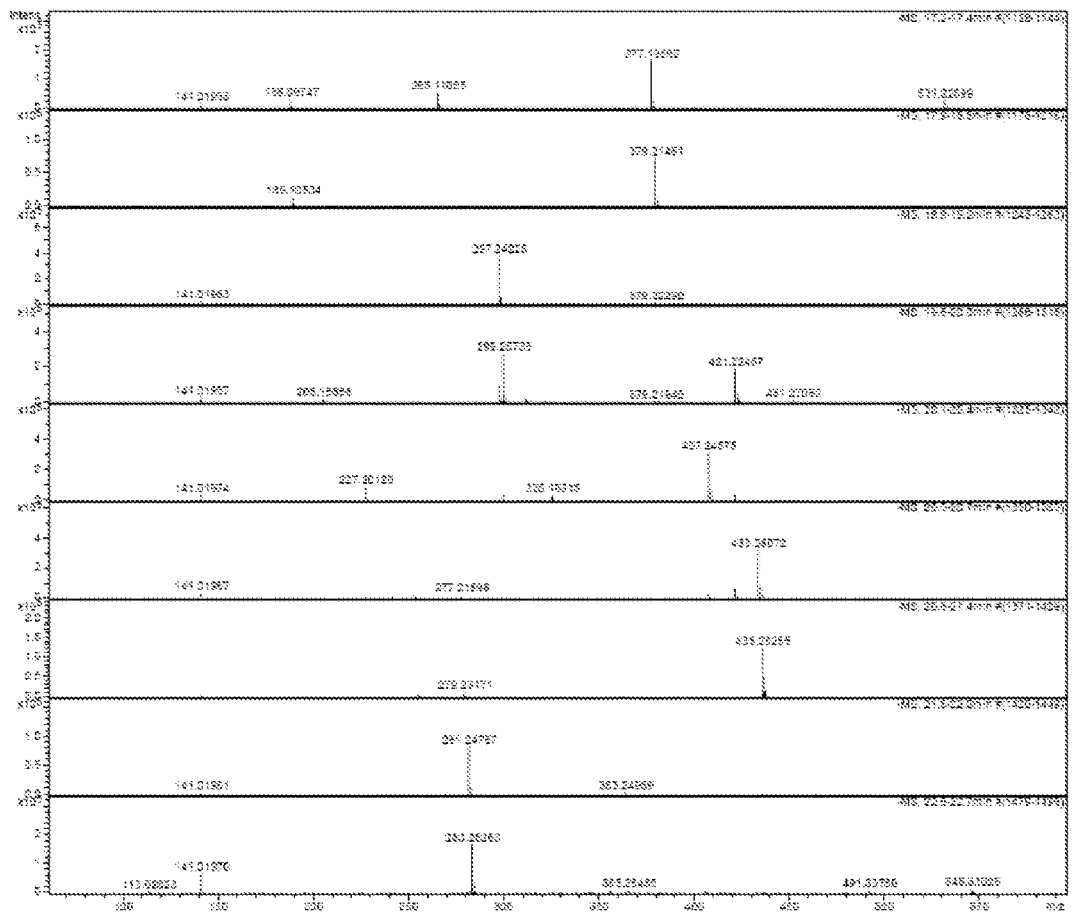
Fig. 7. Ion Chromatography (time-of-flight) Mass Spectrometry (IC-MS) spectrum of certain fractions contained in additive mixture.

Fig. 8. Castor oil is the only known, natural source of ricinoleic fatty acid.

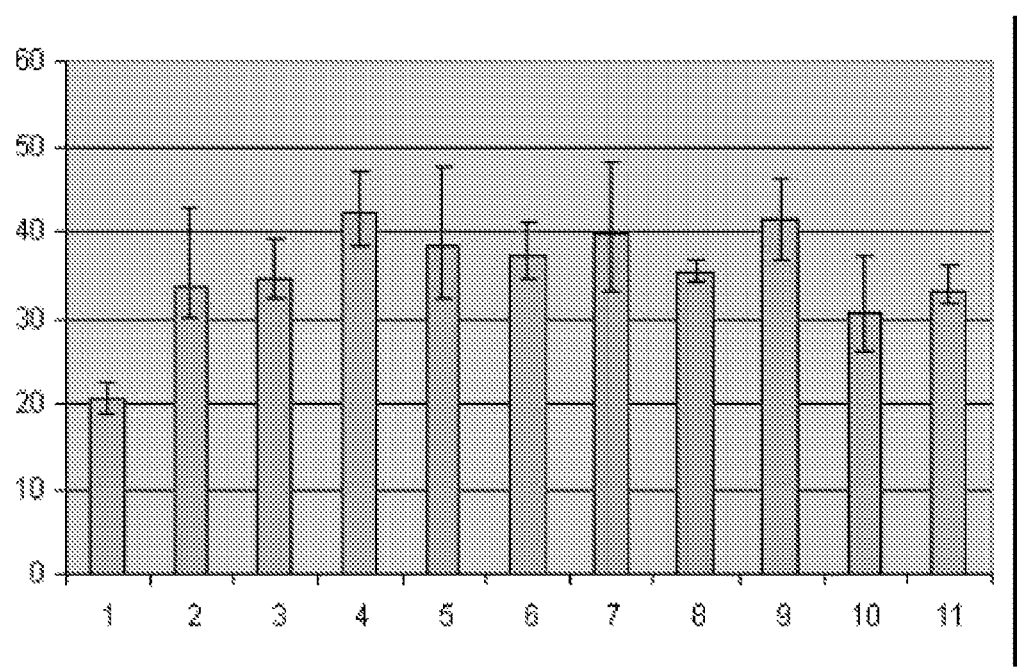
Fig. 9. Averages and Ranges of Values from Table 4.

METAL PLATING ADDITIVE, AND METHOD FOR PLATING SUBSTRATES AND PRODUCTS THEREFROM

FIELD OF INVENTION

This invention relates generally to the manufacture of magnetic memory disks and to an improved procedure for plating a metal substrate with improved electroless nickel (EN) chemistry. The invention reduces defects in the deposited metal coating by inhibiting co-deposition of nonmetallic particles which may be generated in situ or introduced from an external source into an electroless or electrolytic plating solution.

BACKGROUND OF THE INVENTION

Modifications of and chemical refinements to autocatalytic chemical reduction processes, in particular, electroless nickel (EN) plating solutions, are not uncommon. Many of these modifications address concerns related to the bath itself and its inherent properties of stability, plating rate and effective pH operating range for the plating environment. For example, U.S. Pat. No. 2,658,841 teaches the use of soluble organic acid salts as buffers for EN baths. U.S. Pat. No. 2,658,842 teaches the use of short chain, dicarboxylic acids as exaltants to EN baths. U.S. Pat. No. 2,762,723 teaches the use of sulfide and sulfur bearing additives to an EN bath for improved bath stability. U.S. Pat. No. 2,847,327 teaches the use of fatty acid compounds as stabilizers and mild exaltants for EN baths. This latter patent describes the use of numerous surfactants including organic compounds from the class of fatty acids and water-soluble salts thereof, amino compounds, and sulfates and sulfonates of fatty acids and fatty alcohols. What all of these patents have in common, is the use of a compound or class of compounds for the purpose of modifying the inherent properties of the plating bath itself (i.e. its plating rate, stability or useful pH operating range).

Further progress in autocatalytic plating since the U.S. Pat. No. 2,847,327 teaching has introduced other means of stabilizing an EN plating bath. These include the use of higher purity starting materials; more effective stabilizers from the class of heavy metals such as Pb, Sb, Bi, Cu and Se; inorganic compounds such as iodates, and thio compounds; organic compounds such as unsaturated alkenes and alkynes and others. Additionally, improvements in plating bath equipment, such as improved pumping and filtration methods and design, such as air sparging, improved methods of adding the replenishment chemistry to the plating tank and the use of anodic protection circuitry has further reduced concerns over bath stability. This invention is distinguished from U.S. Pat. No. 2,847,327 in that an additive is introduced into the plating bath for the purpose of improving the quality of the metal deposit by preventing, or at least very substantially inhibiting, co-deposition of non-metallic particles in the deposit. The function of the organic compounds in U.S. Pat. No. 2,847,327 is to act upon the bath solution. The function of the organic additive in this invention is to act upon the plated deposit not on the bath. Furthermore, not every organic compound taught in U.S. Pat. No. 2,847,327 will work in the practice of this invention, but only those having a sufficiently high zeta potential that it enables repulsion between the non-metallic, particles and the plating surface.

This invention has particular usefulness in the production of rigid memory disks that are quite commonly used in today's laptop and desktop computers. Details of the construction of thin film magnetic media are taught in U.S. Pat. No. 5,405,646. Media is built up in layers, each of which performs a specific task. The substrate of the disk can be glass, plastic, metal or any other rigid material. Commercially, both glass and aluminum have been widely used. The preferred practice for this invention is for an aluminum substrate. As shown in FIG. 1, an aluminum alloy, typically undergoes at least six wet chemical process steps to build up a hard, corrosion resistant, NiP coating layer. This serves as the underlayer for the subsequent application of magnetic media. It is this magnetic media which ultimately enables storage and deletion of data by electromagnetic currents produced and detected by read/write heads in today's hard-disk drives.

Prior to the application of magnetic media in the production of rigid memory disks, a few more treatments to the NiP coating are required. The plated disks are baked and polished. The polishing step produces an extremely flat and smooth surface for the subsequent sputtering steps and enables the very close fly heights (typically 30 nanometers) for the read/write heads in a finished hard-disk drive. Any slight aberrations or asperities (deviations from flatness) in the deposited coating (whether protrusions above or depressions below the otherwise flat surface) introduce susceptibilities to head crashes between the read/write heads and the surface of the hard-disk. This ultimately reduces the expected service life of these drive components.

It is in the electroless plating step where the present invention provides benefit by significantly reducing the potential for plating defects. During the wet chemical processing steps, the ground, aluminum disks, are racked on a plating fixture. Plating fixtures are very common in metal plating processes. The fixtures can be made from metal, plastic, glass or ceramics. The material chosen depends on many factors. In the production of memory disks, fixtures are commonly made from plastics. Engineering plastics are chosen from those that can withstand the heat and chemistry used in the electroless nickel plating process. These may include: fluorinated plastics, such as polyvinylidene fluoride (PVDF) and polytetrafluoroethylene (PTFE); polysulfone (PSU); polyether ether ketone (PEEK) and polybisimidazole (PBI) among others.

Constant solution exchange at the surface of every disk is essential to refresh the plating chemistry at the surface and to produce a plated article of uniform and consistent composition which is of considerable importance in the memory disk industry. This is afforded by physical movement of both the plating fixture within the bath and vigorous solution mixing. The continuous mechanical movement of the plating fixture (on which the disks are mounted) can be translational, e.g., up and down or side-to-side, rotation and orbital motion of mounting spindles and mandrels, or that provided by some other means, e.g. ultrasonic motion. Solution movement or mixing can be provided by any type of fluid movement, e.g., due to recirculation pumps, cascading flow, jet nozzles, inductors, air sparging or any other means known to those in metal plating art and practice. The tank design can be of any physical shape, size or design as would be needed so that the parts can be contacted with the plating chemistry in such a manner that the metal required is built up and deposited on the object to be plated.

These different types of movement will cause the articles being plated to continually rub and potentially abrade small particles of plastic off the racking fixtures. These particles, having been created within the bath, or even introduced to the plating solution from some other source, be it internal or external, now have the possibility of being directed toward the plating surface. If this particle remains at the surface long enough, it now has the possibility of being encapsulated by the metal being deposited, i.e., built into the deposit and reducing the absolute purity of the coating due to the presence of an undesired, i.e. foreign, particle.

Due to the high degree of solution movement and mechanical motion within the plating tank, there is also a constant rubbing of the aluminum disks across the surface of the PVDF spindle and the polysulfone rod. This continual abrading action in a hot plating bath for nearly two hours at thousands of contact points between metal disks and plastic spindles and rods can cause small plastic particles to be detached and introduced into the plating solution. If these particles come in contact with a plating surface and remain there long enough, they can be plated into the growing NiP coating. Plated-in defects like these are known to occur and are of grave concern to production engineers. Once embedded, these particles can become exposed at the surface during the subsequent production step of polishing. A plastic particle located at the surface of the NiP layer can then become completely or partially dislodged when the final magnetic media is applied during the sputtering steps where heat (ca. 200-250° C.) is momentarily encountered.

When an asperity such as this is produced (i.e., a plastic protrusion or inclusion), hard disk reliability cannot be guaranteed because of the extremely low fly heights of the read/write heads over the surface of the spinning disk and the potential for head crashes. The head crash can be the result of either direct physical contact with the particle or a protrusion caused by it or due to a turbulent air flow pattern, as might be produced from a cavity or depression in the surface wherein a particle that once resided in the deposit as a foreign object has been produced due to a subsequent production step in the manufacture of the hard disk prior to the completed assembly of the final product. When this type of plating defect is found, even in just one disk from a plating batch of several thousand, the entire batch of disks is discarded and substantial losses are incurred.

To substantially avoid this type of inclusion, or vestige of its former presence, indicates that substantially no particles are detected in any article examined. In the hard disk industry "substantially" indicates no particles are allowed, i.e., the count frequency must be zero among those parts that are inspected. In other industries where particle dimension are even smaller than those encountered in the memory disk industry, e.g. some nano-engineering industry wherein foreign particles on a nanometer or picometer scale are of great commercial concern, the term "substantially" allows for a finite frequency of particles but it would be demonstrably, and statistically less than the number of foreign particles found when compared with a metal plating process by any commonly used statistical method for determining the purity (i.e., absence of the foreign particle) of the plated deposit.

One way of addressing this issue, relies on the high solution turnover and the use of in-line filtration to remove these particles. However, since the particles are generated within the plating tank, the possibility always remains that they may come into contact with the plating disks and remain there long enough to be encapsulated into the NiP coating.

Therefore, it is the object of the present invention to improve the quality of the plated deposit on a metal substrate with an autocatalytic chemistry. Of particular benefit is the application wherein a ground aluminum substrate is coated with an electroless nickel phosphorus alloy as in the manufacturing procedure used to produce rigid memory disks. As an enhancement to the present state of the art, the electroless nickel chemistry is modified with certain additives to nearly completely prevent the likelihood of co-depositing plastic particles in the coating.

SUMMARY OF THE INVENTION

This invention relates to the use of certain additives in a metal plating bath to improve the quality, i.e., the purity of the deposited coating. In one particular application, the manufacture of rigid memory disks, a certain sulfated fatty acid ester additive, e.g., of castor oil, has been found to be exceptionally useful. It is represented by the formula

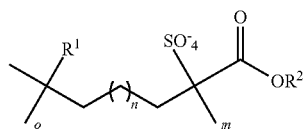

wherein $R^1$ is selected from the group consisting of OH, $OCH_3$, $OCH_2CH_3$, $C_1$-$C_7$ alkyl, linear or branched;
$R^2$ is selected from the group consisting of H and $C_1$-$C_7$ alkyl, linear or branched;
m is an integer ranging from 1 to about 5;
n is an integer ranging from 2 to about 30;
o is an integer ranging from 0 to about 10;
M+ is a metal or pseudo metal ion or $H^+$.
In the context of the present invention, preferred alkyl groups contain 1 to 7, preferably 1 to 5, more preferably 1 to 3 carbon atoms. Preferred alkyl groups are methyl, ethyl, propyl, isopropyl and butyl.

o is an integer which can range from 0-10, preferably from 0-3. It cannot exceed 2×(3.5+n)−m due to the valency of the alkyl chain. Both $R^1$ and $SO_4^-$ can be located at any position of the carbon chain, which is denoted by the drawing above. If the carboxylic acid is a fatty acid as starting product for the sulfation the sulfate group is positioned at either one carbon atom of the former double bond. A pseudo metal ion can for example be $NH_4^+$. A preferred embodiment of the invention utilizes sulfated esters of caster oil as additive represented by the formulae below:

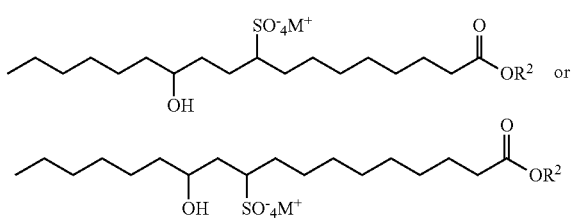

wherein $R^2$ is selected from the group consisting of H and $C_1$-$C_7$ alkyl, linear or branched, and $M^+$ is a metal or pseudo metal ion or $H^+$.

This invention further relates to the use of certain additives in a mixture produced from the sulfation and esterification of a fatty acid or mixtures and salts thereof used in a metal plating bath represented by the formula

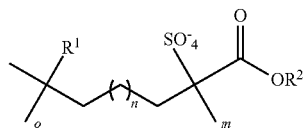

wherein $R^1$ is selected from the group consisting of OH, $OCH_3$, $OCH_2CH_3$, $C_1$-$C_7$ alkyl, linear or branched;

$R^2$ is selected from the group consisting of H and $C_1$-$C_7$ alkyl, linear or branched;
m is an integer ranging from 1 to about 5;
n is an integer ranging from 2 to about 30;
o is an integer ranging from 0 to about 10;
M+ is a metal or pseudo metal ion or $H^+$,
having a zeta potential between about −40 and about −150 mV.

This invention also relates to metal plating composition for substantially avoiding codeposition of non-metallic particles during deposition of a metal or a metal alloy comprising, at least one reaction product additive from a mixture produced from the sulfation and esterification of a fatty acid or mixtures and salts thereof used in a metal plating bath represented by the formula

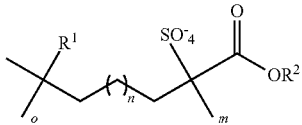

wherein $R^1$ is selected from the group consisting of OH, $OCH_3$, $OCH_2CH_3$, $C_1$-$C_7$ alkyl, linear or branched;
$R^2$ is selected from the group consisting of H and $C_1$-$C_7$ alkyl, linear or branched;
m is an integer ranging from 1 to about 5;
n is an integer ranging from 2 to about 30;
o is an integer ranging from 0 to about 10;
M+ is a metal or pseudo metal ion or $H^+$.

This invention additionally relates to metal plating composition for deposition of nickel and nickel alloys comprising,
(i) a source of nickel ions,
(ii) at least one reaction product additive from a mixture produced from the sulfation and esterification of a fatty acid or mixtures and salts thereof used in a metal plating bath in an amount effective for substantially avoiding co-deposition of non-metallic particles during deposition of nickel alloys represented by the formula

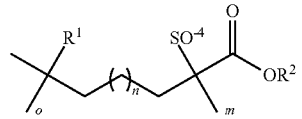

wherein $R^1$ is selected from the group consisting of OH, $OCH_3$, $OCH_2CH_3$, $C_1$-$C_7$ alkyl, linear or branched;
$R^2$ is selected from the group consisting of H and $C_1$-$C_7$ alkyl, linear or branched;
m is an integer ranging from 1 to about 5;
n is an integer ranging from 2 to about 30;
o is an integer ranging from 0 to about 10;
M+ is a metal or pseudo metal ion or $H^+$,
(iii) stabilizing agent;
(iv) complexing agent; and
(v) reducing agent.

This invention relates to a method for depositing an electroless metal or metal alloy on a substrate for substantially avoiding co-deposition of non-metallic particles comprising, plating the substrate with metal or metal alloy while rendering an anionic character to either or both of the nonmetallic particles and the plating surface of the substrate in an autocatalytic plating bath, the plating bath having at least one reaction product additive from a mixture produced from the sulfation and esterification of a fatty acid or mixtures and salts thereof.

This method further relates to a method for fabricating a rigid memory disk comprising, depositing an electroless nickel or nickel alloy coating on a substrate substantially avoiding co-deposition of non-metallic particles, plating the substrate with nickel or nickel alloy while rendering the ionic character of the non-metallic particles and the surface of the plated substrate anionic whereby they repel one another in an autocatalytic plating bath, the plating bath having at least one reaction product additive from a mixture produced from the sulfation and esterification of a fatty acid or mixtures and salts thereof.

This invention also relates to an autocatalytic plated metal or metal alloy coated substrate substantially free of non-metallic particles prepared by a process comprising: plating a ground substrate with metal or metal alloy in an autocatalytic plating bath containing non-metallic particles and at least one reaction product additive from a mixture produced from the sulfation and esterification of a fatty acid or mixtures and salts thereof; rendering the non-metallic particles anionic to substantially inhibit deposition of the non-metallic particulates within the coating of the substrate; whereby a level, essentially non-metallic, asperity-free, coated substrate being prepared; the coated surface of substrate having an average roughness of about 21 nm; the coated substrate being used for magnetic media applications.

BRIEF DESCRIPTION OF THE DRAWINGS

Other features of the invention will be apparent and pointed out below. The descriptions are not considered limiting:

FIG. 1. Flow Chart of Rigid Memory Disk Production;
FIG. 2. Depiction of EN Coating on Al Substrate Plated from a Non-Contaminated, High-P, EN Bath. The Bath did not contain any Additive;
FIG. 3. Depiction of EN Coating on Al Substrate Plated from a High-P EN Bath that was Intentionally Contaminated with 200 nm Plastic Particles. The Bath did not contain any Additive.
FIG. 4. Depiction of EN Coating on Al Substrate Plated from a High-P EN bath that was Intentionally Contaminated with 200 nm Plastic Particles and the Additive of the Present Invention (Example 1);
FIG. 5. Polysulfone Particle Embedded in Electroless Nickel Coating;
FIG. 6. Mixture Separation of the Sulfated, Fatty Acid Ester (Additive) by Ion Chromatography Showing Retention Time on the Column in Minutes;
FIG. 7. Ion Chromatography (time-of-flight) Mass Spectrometry (IC-MS) spectrum of certain fractions contained in additive mixture;
FIG. 8. Castor oil is the only known, natural source of ricinoleic fatty acid.
FIG. 9. Averages and Ranges of Values from Table 4.

DETAILED DESCRIPTION OF THE INVENTION

The invention significantly improves eliminating at least one problem encountered in the production of rigid memory disks (RMDs, e.g. magnetic storage media for hard disk drives). Today's hard disk drives are manufactured with "fly heights" of approximately 30 nm, i.e., the distance between the read/write head and the spinning, magnetic, hard disk. During manufacture of these disks, an aluminum substrate is plated with an electroless nickel alloy (NiP) which serves as the underlayer for the magnetic media layers.

Electroless nickel plating compositions for applying the nickel coatings are well known in the art and plating processes and compositions are described in numerous publications such as U.S. Pat. Nos. 2,935,425; 3,338,726; 3,597,266; 3,717,482; 3,915,716; 4,467,067; 4,466,233 and 4,780,342.

In general, NiP deposition solutions comprise at least four ingredients dissolved in a solvent, typically water. They are (1) a source of the nickel ions, (2) a reducing agent, (3) an acid or hydroxide pH adjuster to provide the required pH and (4) a complexing agent for metal ions sufficient to prevent their precipitation in solution. A large number of suitable complexing agents for NiP solutions are described in the above noted publications. It will be appreciated by those skilled in the art that the nickel, or other metal being applied, is usually in the form of an alloy with the other materials present in the bath. Thus, if hypophosphite is used as the reducing agent, the deposit will contain nickel and phosphorus. Similarly, if an amine borane is employed, the deposit will contain nickel and boron as shown in U.S. Pat. No. 3,953,654, supra. Thus, use of the term nickel includes the other elements normally deposited therewith.

The nickel ion may be provided by the use of any soluble salt such as nickel sulfate, nickel chloride, nickel acetate, nickel methyl sulfonate and mixtures thereof. The concentration of the nickel in solution may vary widely and is about 0.1 to 60 g/l, preferably about 2 to 50 g/l, e.g., 4 to 10 g/l.

The reducing agent, especially for memory disks, is usually the hypophosphite ion supplied to the bath by any suitable source such as sodium, potassium, ammonium and nickel hypophosphite. Other reducing agents such as amine boranes, borohydrides and hydrazine may also suitably be employed. The concentration of the reducing agent is generally in excess of the amount sufficient to reduce the nickel in the bath.

The baths may be acid, neutral or alkaline and the acid or alkaline pH adjustor may be selected from a wide range of materials such as ammonium hydroxide, sodium hydroxide, hydrochloric acid and the like. The pH of the bath may range from about 2 to 12, with acid baths being preferred. A pH range of 4 to 5, e.g., 4.3 to 4.6, being preferred.

The complexing agent may be selected from a wide variety of materials such as those containing anions such as acetate, citrate, glycollate, lactate, malate, succinate, pyrophosphate and the like, with mixtures thereof being suitable. Ranges for the complexing agent, based on the anion, may vary widely, for example, about 1 to 300 g/L, preferably about 5 to 50 g/l.

The electroless nickel plating baths may also contain other ingredients known in the art such as buffering agents, bath stabilizers, rate promoters, brighteners, etc. Stabilizers such as compounds containing lead, antimony, bismuth, mercury, tin, selenium, sulfur, and oxy compounds such as iodate may be employed.

A suitable plating composition may be formed by dissolving the ingredients in water and adjusting the pH to the desired range.

The zinc coated aluminum part pay be plated to the desired thickness and deposit quantity by immersing the part in the nickel plating bath which is maintained over a temperature range of about 30 to 100° C., e.g., boiling, preferably 82 to 93° C. A thickness up to 50 microns, or higher may be employed, with a range of about 6 to 14 microns being used for most applications.

It will be appreciated by those skilled in the art that the rate of plating may be influenced by many factors including (1) pH of the plating solution, (2) concentration of reductant, (3) temperature of the plating bath, (4) concentration of soluble nickel, (5) ratio of volume of bath to the are plated, (6) presence of soluble fluoride salts (rate promoters) and (7) the method and design of solution agitation, and that the above parameters are only provided to give general guidance for practicing the invention.

A high phosphorus NiP alloy is herein defined as a metallic coating containing less than 90% Ni and more than 10% P. (However, the invention is not limited to NiP coatings of this composition only. Coatings with phosphorus contents ranging from 0 to 15% should also benefit equally well.) A nickel-phosphorus (NiP) alloy containing more than about 10.5% phosphorus is known as a high phosphorous NiP coating and is paramagnetic (non-magnetic) as plated. During the plating operation, circular disks of ground aluminum are racked (mounted) on spindles. These spindles are typically constructed from a chemically inert plastic such as polyvinylidene fluoride (PVDF) or polytetrafluoroethylene (PTFE), and they are mounted on a mandrel. The Al disks are kept separated from one another by groves on the spindles. To keep the disks into their respective groves and prevent them from jumping out of their grove and "mating" with the next disk, a long polysulfone rod is inserted between the spindle and the center hole of the Al disk. (This rod eliminates the possibility of the two adjacent disks from coupling and preventing access of the chemistry to both sides of every disk.) Thus, there is intimate contact, by nature of the racking operation, between the center edges of the aluminum disks and the polysulfone (PSU) rod. Due to this contact, and the continuous revolving motion of the spindle on its own axis, the orbital axis of the mandrel and the side-to-side movement of the disks due to rapid, laminar fluid flow of the EN chemistry within the plating tank, plastic particles of PSU can be abraded off the polysulfone rod or the PVDF spindle.

These plastic particles are now free floating in the EN plating solution and can approach and touch the plating surfaces of the substrate. If the particles maintain contact with the surface of the disk long enough they may be plated into the NiP alloy. If this occurs, it causes entire loads of parts to be reduced to scrap. The incorporated particles are known to render the RMD vulnerable to "head crashes" and unreliable data retrieval. An example of an embedded polysulfone particle is shown in FIG. 5. Preventing the inclusion of these plastic particles and other forms of minute contamination into the EN coating, is of absolute concern to hard disk substrate manufacturers. A particular additive discussed herein (a sulfated fatty acid ester) has been found to substantially avoid this co-deposition (incorporation or encapsulation) of plastic particles into EN coatings.

The additives according to the present invention have particular ionic attributes. They have a zeta potential of less than −30 mV, preferably less than −40 mV, and alternatively less than −50 mV. The reason for this is the mode of action according to the present invention. As the scale of the foreign object to be excluded from the coating becomes ever smaller, the preferred zeta potential will become increasingly more negative. Surfactants according to the present invention have ionic attributes different from that of the additive.

It has been found that the use of this additive in electroless nickel (EN) plating yields a highly beneficial result for the rigid memory disk (RMD) industry. The benefit provided is two-fold: (1) it has been demonstrated to prevent so-called, inclusion plating defects by rejecting plastic particulates (and possible other foreign particles) in the plating bath from being co-deposited into the EN alloy and (2) it is believed to have a leveling effect on the deposited layer.

This additive is the reaction product obtained from the sulfulation of butyl oleate. The butyl oleate is itself a reaction product from the esterification of a naturally occurring fatty acid, i.e., from castor oil. For simplicity, the additive will herein be referred to as sulfated, butyl oleate or more generally, as a sulfated fatty acid ester. This additive is actually a complex mixture as it is derived from a natural oil that is itself a mixture of saturated and unsaturated fatty acids and the mixture is very difficult to purify into a single, pure compound. This additive has been demonstrated to provide the benefits described above at a concentration range between 0.5 and 30 ppm and the most preferred concentration is from 1 to 10 ppm. See FIGS. 2, 3 and 4, the legends for which are self-explanatory.

The additive of this invention is a complex mixture of different esterified and sulfated, long chain (mostly C16 and C18) fatty acids. At least 15 components have been identified in the additive. Two such components that have structures consistent with the MS data are:

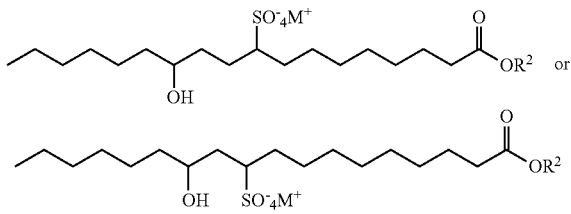

wherein $R^2$ is selected from the group consisting of H and $C_1$-$C_7$ alkyl, linear or branched, and $M^+$ is a metal or pseudo metal ion or $H^+$.

In FIG. 6, a series of peaks eluted off a liquid chromatography column at different retention times is shown. Each peak is associated with a different, "pure" compound within the mixture. To further characterize this mixture, these eluted compounds were subsequently ionized and introduced into a Mass Spectrometer to determine and their specific molecular weights. This technique of chemical analysis is known as Ion Chromatography (time-of-flight) Mass Spectrometry (IC-TOF-MS). From an interpretation on the data using this method (FIG. 7) various chemical species in the additive mixture were identified. The substances found in the analysis include unsaturated and saturated sulfo-oxy-fatty acids and esters thereof (most probably butyl-esters), unsaturated and saturated hydroxy-fatty acids and esters thereof (most probably butyl-esters), unsaturated and saturated fatty acids and esters thereof (most probably butyl-esters), alkyl ether of hydroxyl-fatty acid-ester. Thus, the additive is a complex mixture of oils, fatty acid (or carboxylated) oils and sulfated/sulfonated fatty acid oils, Furthermore, the signature of the components from the IC-TOF-MS spectra highly suggest the starting fatty acid was castor oil. The primary fatty acid in castor oil is ricinoleic acid. It is also the only known, natural source this fatty acid (see FIG. 8). The complexity of a sulfated fatty acid (or its esters) is further described in U.S. Pat. Nos. 2,743,288; 4,086,256; 4,226,796; 4,261,916; British Patent No. 999,300 and the Encyclopedia of Chemical Technology (Kirk-Othmer, Encyclopedia of Chemical Technology, Fourth Ed. p 308-309).

The IC-MS (Ion Chromatography-Mass Spectrum) shown in FIG. 6 for this additive is consistent with a starting material of ricinoleic acid as the starting fatty acid. When this fatty acid is esterified and then sulfated, a complex mixture of components can be expected[1]. Ricinoleic acid is found naturally in castor oil. This oil is believed to be the only naturally occurring source of ricinoleic acid. At the present time, it is not know which fraction (or fractions) of the parent additive is responsible for the benefit effected in the EN bath, or whether it is the entire mixture itself. Further testing will be done with related materials to help identify the mechanism. At the present time, it is believed that a high zeta potential is at the crux of the invention.

Zeta potential relates to the ionic charge (sign) and magnitude of a surface in a liquid medium. Negatively charged species are referred to as anionic. Positively charged species are referred to as cationic. Zero charged species are referred to as non-ionic and there is another class, which has both a positive center of charge and a negative center of charge. These doubly charged species are called amphoteric or zwitterions.

It is well known that species having the same charge on them are electrostatically repelled from each other and those of opposite charge are attracted. In the EN plating bath, chemical reduction occurs at the plating surface. This process creates a negative charge on that surface. Additionally, if the additive introduced into the EN solution adsorbs to the metal surface, it will become further negative charged.

The additive of this invention has a zeta potential less than or equal to −40 mV. This classifies it as an anionic species with a fairly strong negative charge. Zeta potential can be measured using a NanoSizer ZS from Malvern. Having a high zeta potential on the particles as induced by the additive is believed to gives rise to its effectiveness for enhancing the quality of the deposited metal.

Zeta potential has to do with how large and how quickly the electrical potential at the surface of a substrate or particle changes over distance between that surface and the liquid medium it touches. This property influences the ability of particles to coalesce or avoid each other in that particular system. As a result, the zeta potential is a function of several parameters, some of which are temperature, pH, conductivity, solution viscosity, particle size, concentration, sample preparation and sample measurement history. For this reason, a standardized method of measuring this property for comparing one surfactant or additive to another is necessary.

The zeta potentials reported for the additives in these examples were measured with a Malvern NanoSizer ZS in the following way: A stock solution electrolyte was prepared by adding 5 ml of the High-Phosphorus, electroless nickel bath at 2.5 MTOs (metal turnovers) to 1 liter of water. The resulting electrolyte had conductivity of 1.5 milli-Siemens and a pH of approximately 4.8. A test sample was then prepared by adding 1 ml of a 1 g/l aqueous solution of the test additive to 9 ml of the stock electrolyte, thus producing a 100 ppm solution. The 10 ml mixture was hand shaken in a 15 ml plastic vial and introduced into a disposable, 1 ml zeta cell as supplied by Malvern. Three aliquots of the 100 ppm additive test solution, each of approximately 3 ml, were successively passed through a 0.02 micron syringe filter (ANOTOP 6908-2002 aluminum oxide membrane) and through the flow through dip cell. After inspection, to ensure no bubbles were in the "u" tube, the zeta cell was placed into the NanoSizer ZS for measurement. The measurements were taken at 25° C. and the fluid viscosity is essentially that of water.

The measurement routine consisted of a subroutine of one particle size measurement, one zeta potential measurement and one 30 second pause which was repeated for two consecutive cycles. The particle size measured is that which is produced from the first zeta measurement cycle. The zeta potentials measured on the second run were selected for comparisons and are reported in the Table below. (Triton DF-16 and allyltriphenyl phosphonium bromide were not measured.)

| Additive | Zeta Potential, mV |
|---|---|
| Sulfated butyl oleate | −48.3 |
| Ethomeen C25 | −4.8 |
| Petro Powder 22 | −13.3 |
| Plurafac C17 | +11.5 |
| Triton DF-20 | −16.4 |
| Mirataine JC-HA | −24.5 |
| Chemeen C2 | +29.4 |

Non-metallic particles which can be created in a plating bath due to mechanical abrasive action of plating fixtures and the articles being plated can become coated with the additive (or a component of the additive) which shrouds this particle with a negative charge. Since both the article being plated and the non-metallic particle are sufficiently negatively charged, these two solid bodies have a tendency to avoid each other. Also, because the number of non-metallic particles created over time may be small, only a small amount of the effective anionic species may be required. These negatively charged particles are repelled from the likewise negatively charged article being plated and remain in the bulk solution long enough for them to be completely transported out of the plating solution by solution turnover. They can then be removed from the plating solution downstream by filtration cartridges.

Because there are some unreacted oils in the additive, there is an upper limit to the useful concentration. At too high a concentration, gas pitting on the plating surface occurs. One such industrial trial wherein the additive concentration was 30 ppm, produced an unacceptable level of gas pits. The most effective concentration range is believed to be between 1 and 30 ppm. The most preferred is concentration is between 2 to 10 ppm of the sulfated, fatty acid which was commercially supplied at 65% solids. The other 35% being water.

EXAMPLES

The following experiments are considered to describe the invention but are viewed as non-limiting embodiments.

The compositions and process of the present invention will now be more fully illustrated by the following specific examples, which are illustrative and in no way limiting and wherein all parts and percentages are by weight and temperatures in degrees Celsius unless otherwise noted.

Example 1

5056 aluminum alloy disks were double zincated and plated with ENP using the following procedure (a cold water rinse followed each of the steps):
(1) Immerse in an alkaline soak cleaner for 5 minutes at 60° C.;
(2) Immerse in an acid cleaner for 2 minutes at 60° C.;
(3) Immerse in 50% by volume $HNO_3$ for 1 minute at room temperature;
(4) Immerse in an alkaline zincate solution for 35 seconds at room temperature;
(5) Immerse in 50% by volume $HNO_3$ for 1 minute at room temperature;
(6) Immerse in an alkaline zincate solution for 16 seconds at room temperature;
(7) Immerse in EN plating without the additive for 110-120 minutes at 86° C., (pH 4.4-4.5).

Specific examples of pretreatment chemistry in steps (1) to (6) can be found in a standard metal finishing handbook. The EN bath contains nickel sulfate hexahydrate, sodium hypophosphite, and other ingredients as discussed above.

Example 2

Example 1 was repeated except that a reaction mixture derived from sulfating the butyl ester of castor oil was added at 10 ppm. No plastic particles were found in the nickel-phosphorus coating. The additive was added over the side of the plating tank to a commercial EN chemistry. It was found to produce a dramatic and beneficial property of excluding small particles in the deposited NiP alloy. This benefit is of significant value in applications where small particle incorporation is a major source of unacceptable defects, e.g. in rigid memory disks. In this application, all types of "foreign particles" are desired to be excluded from the deposited EN coating. In the particle use of this invention, these particles can include, but are not limited to, plastics such as polysulfone, polytetrafluoroethylene, poly(vinylidene fluoride), polypropylene; non-plastics such as, nickel orthophosphite, ferric or ferrous orthophosphate, dust particles, carbonaceous contaminants, etc. The reduction in these inclusions, specifically, polysulfone and fluorinated plastics is essentially complete. That is 100% exclusion of these types of particles. This was a requirement for this chemistry during the production trials where rigid memory disks were plated. In the event that even one plastic inclusion to the NiP alloy was found, the entire lot of plated aluminum substrates were scrapped and not processed any further.

Example 3

Example 1 was repeated except that a reaction mixture derived from sulfating the butyl ester of castor oil was added at 30 ppm. The plated aluminum disks had an unacceptable high amount of gas pits. Analysis for included particles was not done.

Example 4

An electroless nickel coating composition comprising nickel, a reducing agent, a complexing agent, a metallic stabilizer and a non-metallic, pre-aging salt may be improved by a chosen additive as a particle, co-deposition inhibitor, preferably in an amount from about 1 to about 10 milligrams per liter (mg/l). The non-metallic, pre-aging salt may or may not be added and the effectiveness of the invention is not compromised. This orthophosphate salt is a natural by-product of the chemical reduction process when hypophosphite is used as the reducing agent. The amount of this by-product in the EN bath is related to how long the bath has been used. This bath age is referred to in the plating industry as the number of metal turnovers or MTOs of the bath. When an electroless nickel bath is used, nickel salt and a reducing agent must be replenished as nickel is plated, so as to continue the effective use (or life) of the bath. When the amount of the nickel salt added back is equal to the initial amount of nickel contained in the original plating solution, the bath is said to have plated one metal turnover, MTO.

To test the effectiveness of various additives to be used as a particle, deposition inhibitors, an electroless nickel bath was used containing:

TABLE 1

Composition of the Electroless Nickel Bath

| Component | g/l |
|---|---|
| Nickel sulfate hexahydrate (salt) | 22.4 |
| Sodium Orthophosphite (pre-aging salt) | 60.0 |
| Lactic acid (90%) (complexor/chelator) | 14.4 |
| Malic Acid (complexor/chelator) | 19.8 |
| Succinic Acid (complxor/chelator) | 6.1 |
| Sodium Hypophosphite Monohydrate (reducing agent) | 24.0 |
| Lead Nitrate (stabilizer) | 0.00076 |

The bath pH was adjusted to 4.8 with ammonium hydroxide heated to 88° C. A ground aluminum disk of the type used in the manufacturing of rigid memory disks was used. It was first prepared by carefully cutting it into 12 pie-wedge pieces having essentially the same dimensions. All 12 pieces had a small ⅛ inch hole punched in them and were suspended from a plastic rod using a short piece of aluminum wire. These same 12 parts were then identically pretreated using a typical, double zincate process well known in the metal finishing industry. This process consists of immersing the parts in a mild alkaline soak cleaner, an acid cleaner, an alkaline zinc bath (first zincate), a nitric acid strip, and finally a second alkaline zinc bath (the second zincate). The parts were rinsed with running water after each pretreatment process step. After the final rinsing step the parts were placed into an electroless nickel bath.

Two liters of the EN bath shown in Table 1 were prepared and filtered through a 0.45 micron filter. Inside a laminar flow hood, 100 ml of the EN bath was poured off into a 100 ml graduated cylinder and placed in a water bath regulated at 88° C. This was the first control bath which contained no deliberately introduced polysulfone particles.

One milliliter of an aqueous dispersion of polysulfone (PSU) particles was added to the remaining 1900 ml of EN bath chemistry. The dispersion was a suspension of synthetically produced, 200 nanometer polysulfone particles. Thus, the remaining bath was deliberately contaminated with a material known to be incorporated in the EN deposit during the production of rigid memory disks.

One liter of the deliberately contaminated EN bath from above was portioned out into ten, 100 ml graduated cylinders. One additive was added to nine of ten test solutions. No additive was added to the tenth solution and this was the second control bath containing the synthetically produced PSU contamination particles. Nine additives were evaluated at a concentration level of 10 ppm. These are shown in Table 2 below:

TABLE 2

Surfactants Tested in EN Bath Chemistry

| Example | Additive | PSU Particles Added |
|---|---|---|
| C1 | None | No |
| C2 | None | Yes |
| 1 | Reaction mixture of sulfated butyl oleate (from castor oil) | Yes |
| 2 | Ethomeen C25 (Tert-amines of fatty acids) | Yes |
| 3 | Petro Powder 22 (Sodium alkyl naphthalene sulfonate) | Yes |
| 4 | Plurafac C-17 (Alcohols, C10-12, ethoxyl) | Yes |
| 5 | Triton DF-16 (Alcohols, C-8-C10, ethoxylated propoxylated) | Yes |
| 6 | Triton DF-20 (Modified ethoxylate, acid form) | Yes |
| 7 | Allyltriphenyl phosphonium bromide | Yes |
| 8 | Mirataine JC HA (Alkylaminopropionate) | Yes |
| 9 | Chemeen C2 (Ethoxylated coco amine) | Yes |

All eleven test solutions were placed in a water bath regulated at 88° C. The aluminum parts pretreated as described above were then immersed in the test solution and plated for 15 minutes, rinsed, dried and examined by eye as well as 5,000× magnification using a SEM.

Under simple visual examination, the deposit plated from the bath of Example 1 was very noticeably brighter than all ten other deposits. The other ten deposits had a slight haze to them. Example deposit 1 had none.

Photomicrographs of the different, as-plated deposits (shown in FIGS. 2, 3, and 4) are magnified 5,000 times in a SEM and compared. Again, there was a striking difference noted for the deposit plated from the bath in Example 1 of Table 2. Compared to all other surfaces, this surface was remarkably free of tiny, circular asperities measuring approximately 1 µm in diameter. These asperities are believed to arise from encapsulated, particles of contamination. A rough counting of the number of asperities observed within 1,500 square µm area was made and the results are shown in Table 3:

TABLE 3

Surface Asperities Counted in Plated Deposits per 1,500 µm$^2$

| Sample | Additive | PSU Particles Added | Ionic Character | Asperity Count |
|---|---|---|---|---|
| 1 | Reaction mixture of sulfated butyl oleate (from castor oil) | Yes | Anionic | 12 |
| 2 | Ethomeen C25 (Tert-amines of fatty acids sulfonate) | Yes | Cationic | 640 |
| 3 | Petro Powder 22 (Sodium alkyl naphthalene sulfonate) | Yes | Anionic | 560 |
| 4 | Plurafac C-17 (Alcohols, C10-12, ethoxyl) | Yes | Non-ionic | 800 |
| 5 | Triton DF-16 (Alcohols, C8-C10, ethoxylated propoxylated) | Yes | Non-ionic | 640 |

TABLE 3-continued

Surface Asperities Counted in Plated Deposits per 1,500 μm²

| Sample | Additive | PSU Particles Added | Ionic Character | Asperity Count |
|---|---|---|---|---|
| 6 | Triton DF-20 (Modified ethoxylate, acid form) | Yes | Anionic | 640 |
| 7 | Allyltriphenyl phosphonium bromide | Yes | Cationic | 640 |
| 8 | Mirataine JC HA (Alkylaminopropionate) | Yes | Amphoteric | 500 |
| 9 | Chemeen C2 (Ethoxylated coco amine) | Yes | Cationic | 640 |
| 10 | None | No | N/A | 360 |
| 11 | None | Yes | N/A | 560 |

A significant difference is observed between sample 1 plated from the formulation containing the sulfated, fatty acid ester compared to all other samples, including the two controls, one of which had no PSU particles added to it (sample 10). Because the stock solution that all baths were plated from was only filtered through a 0.45 μm filter, the stock could have contained other none PSU particles. If this was the case, the additive in the bath used to plate sample 1 also prevented those particles from co-depositing.

Another distinction between sample 1 and all other samples can be made. The grooves from the preparative grinding of the aluminum substrate were much less pronounced in that deposit. That is, the surface of the deposit appears smoother for this sample than all of the others. This smoothness can be quantified by measuring the average roughness, Ra, for each of these coatings. Average roughness is a measure of the average distance between low points and high points on the surface of the sample over a given area of surface. The lower the Ra, the flatter the surface. Using interference microscopy, five roughness measurements for each of the eleven samples in Table 4 were recorded. The area examined on each sample measured 62.4 μm×62.4 μm area. The average roughness, Ra, was then calculated. The raw measurements are shown in the Table 4 and the average value is plotted graphically in FIG. 9. This data shows that, in fact, the deposit of sample 1 is statistically flatter than both controls and the other eight samples as well.

TABLE 4

Average Ra for 11 NiP Deposits
Ra (nm)

| sample | 1 | 2 | 3 | 4 | 5 | Ø |
|---|---|---|---|---|---|---|
| 1 | 19 | 20 | 20 | 22 | 22 | 21 |
| 2 | 30 | 30 | 34 | 43 | 31 | 34 |
| 3 | 32 | 34 | 34 | 34 | 39 | 35 |
| 4 | 47 | 39 | 40 | 39 | 47 | 42 |
| 5 | 33 | 42 | 38 | 32 | 48 | 39 |
| 6 | 36 | 38 | 36 | 41 | 35 | 37 |
| 7 | 33 | 37 | 36 | 44 | 48 | 40 |
| 8 | 36 | 36 | 35 | 35 | 37 | 36 |
| 9 | 37 | 37 | 43 | 46 | 45 | 42 |
| 10 | 26 | 38 | 28 | 31 | 30 | 31 |
| 11 | 36 | 32 | 32 | 33 | 33 | 33 |

As various changes could be made in the above without departing from the scope of the invention, it is intended that all matter contained in the above description and shown in the accompanying drawings shall be interpreted as illustrative and not in a limiting sense. The above cited references are hereby incorporated by reference.

What is claimed is:

1. A method for depositing an electroless metal or metal alloy on a substrate for substantially avoiding co-deposition of non-metallic particles comprising, plating the substrate with metal or metal alloy while rendering an anionic character to either or both of the non-metallic particles and the plating surface of the substrate in an autocatalytic plating bath, the plating bath having at least one reaction product additive from a mixture produced from the sulfation and esterification of a fatty acid or mixtures and salts thereof,
   wherein the at least one reaction product additive is represented by the formula

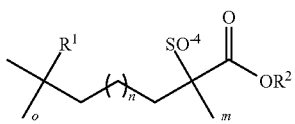

wherein $R^1$ is selected from the group consisting of OH, $OCH_3$, $OCH_2CH_3$, $C_1$-$C_7$ alkyl, linear or branched;
$R^2$ is selected from the group consisting of H and $C_1$-$C_7$ alkyl, linear or branched;
m is an integer ranging from 1 to about 5;
n is an integer ranging from 2 to about 30;
o is an integer ranging from 0 to about 10;
M+ is a metal or pseudo metal ion or $H^+$, and
the plating bath having a zeta potential between −40 and −150 mV.

2. The method according to claim 1, wherein the substrate is iron, nickel or aluminum or an alloy of such metal or metals.

3. The method according to claim 1, wherein the metal is nickel and a plated nickel or nickel alloy layer has a thickness of about 1 to about 75 μm.

4. The method according to claim 3, wherein the thickness is between about 8 and about 15 μm.

5. The method according to claim 1, wherein the temperature of the plating bath is between about 40 and about 95° C.

6. The method according to claim 1, wherein the plating bath further includes stabilizing agent, complexing or reducing agent, or mixtures thereof.

7. The method according to claim 1, wherein the non-metallic particles are plastic.

8. The method according to claim 7, wherein the plastic is polysulfone.

9. The method according to claim 7, wherein the plastic is polyvinylidene fluoride.

10. The method according to claim 7, wherein the plastic is polytetrafluoroethylene.

11. The method according to claim 1, where the plated substrate is a precursor for a rigid memory disk.

12. The method according to claim 1 wherein the autocatalytic plating bath contains a sufficient quantity of the at least one reaction product additive that the plated metal or metal alloy coated substrate is substantially free of non-metallic particles co-deposited on the substrate.

13. A method for fabricating a rigid memory disk comprising,
   depositing in an autocatalytic plating bath an electroless nickel or nickel alloy coating on a substrate substantially avoiding co-deposition of non-metallic particles,
   plating the substrate with nickel or nickel alloy wherein a zeta potential of the autocatalytic plating bath renders the ionic character of both the non-metallic particles and the surface of the plated substrate anionic such that the particles and the surface repel one another in the autocatalytic plating bath, the autocatalytic plating bath having at least one reaction product additive from a mixture produced from the sulfation and esterification of a fatty acid or mixtures and salts thereof, wherein the at least one reaction product additive is represented by the formula

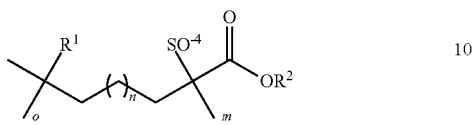

wherein $R^1$ is selected from the group consisting of OH, $OCH_3$, $OCH_2CH_3$, $C_1$-$C_7$ alkyl, linear or branched;
$R^2$ is selected from the group consisting of H and $C_1$-$C_7$ alkyl, linear or branched;
m is an integer ranging from 1 to about 5;
n is an integer ranging from 2 to about 30;
o is an integer ranging from 0 to about 10;
M+ is a metal or pseudo metal ion or H+, and
the zeta potential is between −40 and −150 mV.

14. The method according to claim 13 wherein the autocatalytic plating bath contains a sufficient quantity of the at least one reaction product additive that the plated metal or metal alloy coated substrate is substantially free of non-metallic particles co-deposited.

* * * * *

UNITED STATES PATENT AND TRADEMARK OFFICE
CERTIFICATE OF CORRECTION

PATENT NO.        : 8,557,100 B2
APPLICATION NO.   : 13/123778
DATED             : October 15, 2013
INVENTOR(S)       : Schell et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b)(3) by 217 days.

Signed and Sealed this
Thirty-first Day of May, 2016

Michelle K. Lee
*Director of the United States Patent and Trademark Office*